(12) United States Patent
Song

(10) Patent No.: US 8,982,064 B2
(45) Date of Patent: *Mar. 17, 2015

(54) LIQUID CRYSTAL DISPLAY DEVICE PROVIDED WITH A SENSING ELECTRODE FOR SENDING A TOUCH OF A USER

(75) Inventor: InHyuk Song, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 366 days.

This patent is subject to a terminal disclaimer.

(21) Appl. No.: 13/244,991

(22) Filed: Sep. 26, 2011

(65) Prior Publication Data

US 2012/0086654 A1  Apr. 12, 2012

(30) Foreign Application Priority Data

Oct. 8, 2010 (KR) .......................... 10-2010-0098253

(51) Int. Cl.
*G09G 3/36* (2006.01)
*G06F 3/041* (2006.01)

(52) U.S. Cl.
CPC .................................... *G06F 3/0412* (2013.01)
USPC .......................................... 345/173; 345/104

(58) Field of Classification Search
CPC ....... G06F 3/0142; G06F 3/041; G06F 3/044; G06F 3/0416; G09G 3/36
See application file for complete search history.

(56) References Cited

U.S. PATENT DOCUMENTS

| | | | |
|---|---|---|---|
| 6,583,841 B2* | 6/2003 | Youn et al. ..................... 349/141 |
| 7,936,340 B2* | 5/2011 | Lee et al. ....................... 345/173 |
| 7,995,041 B2* | 8/2011 | Chang ............................ 345/173 |
| 8,031,275 B2* | 10/2011 | Lee .................................. 349/12 |
| 8,217,913 B2* | 7/2012 | Hotelling et al. .............. 345/173 |
| 8,243,027 B2* | 8/2012 | Hotelling et al. .............. 345/173 |
| 8,259,078 B2* | 9/2012 | Hotelling et al. .............. 345/173 |
| 8,400,412 B2* | 3/2013 | Joo et al. ........................ 345/173 |
| 8,552,989 B2* | 10/2013 | Hotelling et al. .............. 345/173 |
| 8,654,083 B2* | 2/2014 | Hotelling et al. .............. 345/173 |

(Continued)

FOREIGN PATENT DOCUMENTS

CN        101261378 A        9/2008
CN        101681221 A        3/2010

(Continued)

OTHER PUBLICATIONS

CN Office Action issued Dec. 4, 2013.

(Continued)

*Primary Examiner* — Dwayne Bost
*Assistant Examiner* — Ivelisse Martinez Quiles
(74) *Attorney, Agent, or Firm* — Morgan, Lewis & Bockius LLP

(57) ABSTRACT

A liquid crystal display device is disclosed, which comprises gate and data lines arranged to cross each other on a substrate to define a pixel region; a pixel electrode formed in the pixel region; a common electrode forming an electric field together with the pixel electrode and sensing a touch of a user; and a sensing line electrically connected with the common electrode, wherein the common electrode includes a plurality of first common electrodes for sensing any one of a touch position of X axis and a touch position of Y axis and a plurality of second common electrodes for sensing the other one of the touch positions of X axis and Y axis, and the sensing line is not electrically connected with the plurality of second common electrodes but electrically connected with the plurality of first common electrodes.

9 Claims, 6 Drawing Sheets

(56) References Cited

U.S. PATENT DOCUMENTS

| | | | |
|---|---|---|---|
| 2007/0024789 A1* | 2/2007 | Itou et al. | 349/139 |
| 2007/0070047 A1* | 3/2007 | Jeon et al. | 345/173 |
| 2008/0018613 A1* | 1/2008 | Kim et al. | 345/173 |
| 2008/0024416 A1* | 1/2008 | Onogi et al. | 345/92 |
| 2008/0062148 A1* | 3/2008 | Hotelling et al. | 345/174 |
| 2008/0218650 A1 | 9/2008 | Koshihara et al. | |
| 2009/0002312 A1 | 1/2009 | Son | |
| 2009/0231304 A1 | 9/2009 | Lee et al. | |
| 2009/0237369 A1* | 9/2009 | Hur et al. | 345/173 |
| 2010/0144391 A1* | 6/2010 | Chang et al. | 455/566 |
| 2010/0149126 A1* | 6/2010 | Futter | 345/174 |
| 2010/0182273 A1 | 7/2010 | Noguchi et al. | |
| 2010/0194707 A1* | 8/2010 | Hotelling et al. | 345/173 |
| 2010/0195004 A1* | 8/2010 | Hotelling | 348/792 |
| 2010/0238134 A1* | 9/2010 | Day et al. | 345/174 |
| 2011/0157039 A1* | 6/2011 | Shin et al. | 345/173 |
| 2011/0267305 A1* | 11/2011 | Shahparnia et al. | 345/174 |
| 2012/0086665 A1* | 4/2012 | Song | 345/174 |

FOREIGN PATENT DOCUMENTS

| | | |
|---|---|---|
| CN | 101825966 A | 9/2010 |
| TW | 201031961 A | 9/2010 |

OTHER PUBLICATIONS

Taiwanese Office Action issued on Mar. 20, 2014 in counterpart Taiwanese Office Action.

* cited by examiner

LIQUID CRYSTAL DISPLAY DEVICE PROVIDED WITH A SENSING ELECTRODE FOR SENDING A TOUCH OF A USER

CROSS REFERENCE TO RELATED APPLICATIONS

This application claims the benefit of the Korean Patent Application No. 10-2010-0098253 filed on Oct. 8, 2010, which is hereby incorporated by reference for all purposes as if fully set forth herein.

BACKGROUND OF THE INVENTION

1. Field of the Invention

The present invention relates to a liquid crystal display device, and more particularly, to a liquid crystal display device provided with a sensing electrode for sensing a touch of a user.

2. Discussion of the Related Art

A liquid crystal display device is widely used in various fields of notebook computers, monitors, spacecraft, aircraft, and etc. owing to advantages of low power consumption based on a low driving voltage and portability.

The liquid crystal display device includes a lower substrate, an upper substrate, and a liquid crystal layer formed between the lower and upper substrates. In the liquid crystal display device, an alignment state of liquid crystal molecules in the liquid crystal layer is controlled based on whether or not an electric field is applied thereto, and light transmittance is controlled according to the alignment state of liquid crystal molecules, whereby images are displayed thereon.

It is general that a mouse or key board is used as an input means of the liquid crystal display device. However, a touch screen, which can allow a user to directly input information using a finger or pen, is mainly applied to a navigation system, a portable terminal and electric home appliances.

Hereinafter, a related art liquid crystal display device provided with a touch screen will be described with reference to the accompanying drawings.

FIG. 1 is a cross-sectional view illustrating the related art liquid crystal display device.

As shown in FIG. 1, the related art liquid crystal display device includes a liquid crystal panel 10 and a touch screen 20.

The liquid crystal panel 10 displays images, and includes a lower substrate 12, an upper substrate 14, and a liquid crystal layer 16 formed between these substrates 12 and 14.

The touch screen 20 is formed on the liquid crystal panel 10 to sense a touch of a user, and includes a touch substrate 22, a first sensing electrode 24 formed below the touch substrate 22, and a second sensing electrode 26 formed on the touch substrate 22.

The first sensing electrode 24 is arranged below the touch substrate 22 in a horizontal direction, and the second sensing electrode 26 is arranged on the touch substrate 22 in a vertical direction. Accordingly, if the user touches a predetermined position, capacitance between the first sensing electrode 24 and the second sensing electrode 26 is varied at the touched position. As a result, the position where capacitance is varied is sensed, whereby the touch position of the user can be sensed.

However, in the aforementioned related art liquid crystal display device, since the touch screen 20 is separately formed on the liquid crystal panel 20, the overall thickness of the liquid crystal display device is increased by the touch screen 20. For this reason, problems occur in that fabricating process steps are complicated and the fabricating cost is increased.

SUMMARY OF THE INVENTION

Accordingly, the present invention is directed to a liquid crystal display device that substantially obviates one or more problems due to limitations and disadvantages of the related art.

An advantage of the present invention is to provide a liquid crystal display device in which a sensing electrode for sensing a touch of a user is built in a liquid crystal panel so as not to require a separate touch screen on the liquid crystal panel, whereby the overall thickness of the liquid crystal display device is reduced, fabricating process steps are simplified, and the fabricating cost is reduced.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display device comprises gate and data lines arranged to cross each other on a substrate to define a pixel region; a pixel electrode formed in the pixel region; a common electrode forming an electric field together with the pixel electrode and sensing a touch of a user; and a sensing line electrically connected with the common electrode, wherein the common electrode includes a plurality of first common electrodes for sensing any one of a touch position of X axis and a touch position of Y axis and a plurality of second common electrodes for sensing the other one of the touch positions of X axis and Y axis, and the sensing line is not electrically connected with the plurality of second common electrodes but electrically connected with the plurality of first common electrodes.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2b is a cross-sectional view taken along line A-A of FIG. 2a, and FIG. 2c is a cross-sectional view taken along line B-B of FIG. 2a;

FIG. 3b is a cross-sectional view taken along line A-A of FIG. 3a, and FIG. 3c is a cross-sectional view taken along line C-C of FIG. 3a;

FIG. 4b is a cross-sectional view taken along line A-A of FIG. 4a; FIG. 5b is a cross-sectional view taken along line A-A of FIG. 5a, and FIG. 5c is a cross-sectional view taken along line C-C of FIG. 5a.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Figure 1:
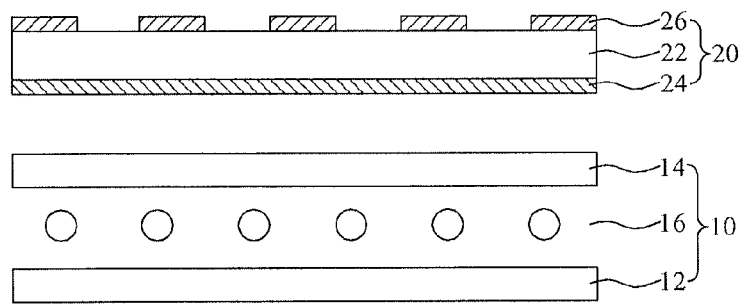
FIG. 1 is a cross-sectional view illustrating the related art liquid crystal display device.
Figure 2A:
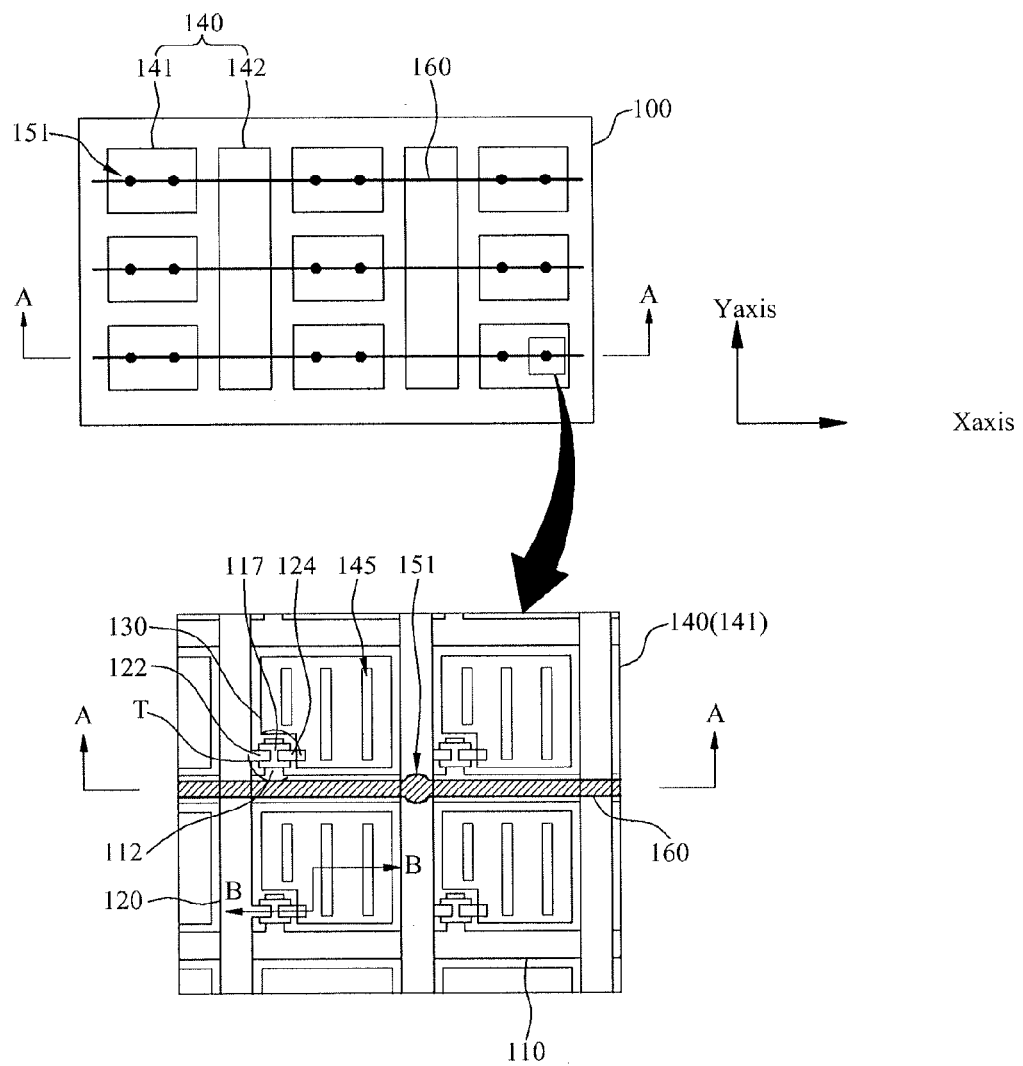
FIG. 2a is a plane view illustrating a lower substrate for a liquid crystal display device according to the first embodiment of the present invention.
Figure 2B:
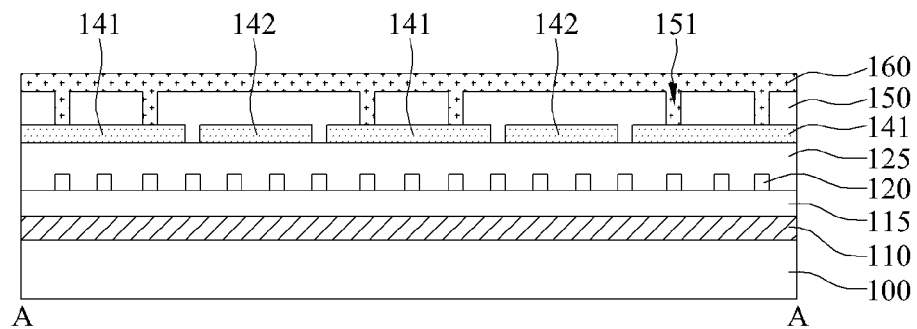
Figure 2C:
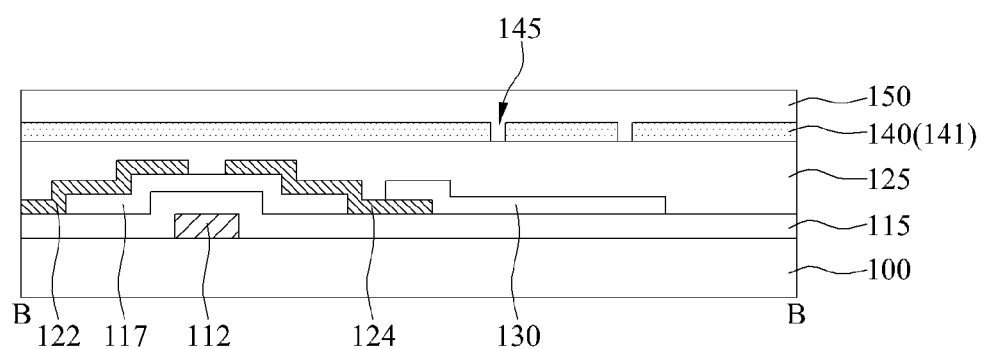

FIG. 2a is a plane view illustrating a lower substrate for a liquid crystal display device according to the first embodiment of the present invention, FIG. 2b is a cross-sectional view taken along line A-A of FIG. 2a, and FIG. 2c is a cross-sectional view taken along line B-B of FIG. 2a.

Referring to FIG. 2a, especially a partially enlarged view marked with an arrow, the liquid crystal display device according to the first embodiment of the present invention includes a substrate 100, a gate line 110, a data line 120, a thin film transistor T, a pixel electrode 130, a common electrode 140, and a sensing line 160.

The gate line 110 is arranged on the substrate 100 in a first direction, for example, X axis direction, and the data line 120 is arranged on the substrate 100 in a second direction, for example, Y axis direction. In this way, the gate line 110 and the data line 120 cross each other to define a plurality of pixel regions. Although the gate line 110 and the data line 120 are arranged in a straight line as shown, they may be arranged in a bent line.

The thin film transistor T is a switching element, and is formed in a region where the gate line 110 and the data line 120 cross each other. The thin film transistor T includes a gate electrode 112, a semiconductor layer 117, a source electrode 122 and a drain electrode 124. The gate electrode 112 is extended from the gate line 110, the source electrode 122 is extended from the data line 120, and the drain electrode 124 faces the source electrode 122.

The aforementioned thin film transistor T may have various structures such as a bottom gate structure where the gate electrode 112 is arranged below the semiconductor layer 117 and a top gate structure where the gate electrode 112 is arranged over the semiconductor layer 117. Also, various modifications may be made in types of the respective electrodes.

The pixel electrode 130 is formed in each of the pixel regions, and is electrically connected with the drain electrode 124 of the thin film transistor T. Particularly, the pixel electrode 130 may directly be connected with the drain electrode 124. But, it is not limited to the above example.

The common electrode 140 serves to drive the liquid crystal layer by forming an electric field together with the pixel electrode 130. Particularly, the common electrode 140 includes one or more slits 145 in the pixel region. Accordingly, a fringe field is formed between the pixel electrode 130 and the common electrode 140 through the slits 145, and the liquid crystal may be driven by the fringe field.

Meanwhile, the common electrode 140 serves to drive the liquid crystal by forming the electric field together with the pixel electrode 130 as described above and also serves as a sensing electrode for sensing a touch position of a user. In order to serve as the sensing electrode, the common electrode 140 is not formed on the entire surface of the substrate 100 but formed in a predetermined pattern.

In other words, as shown in FIG. 2a, the common electrode 140 includes a plurality of first common electrodes 141 and a plurality of second common electrodes 142. At this time, a position of Y axis touched by the user may be sensed by the first common electrodes 141, and a position of X axis touched by the user may be sensed by the second common electrodes 142.

The sizes of the first and second common electrodes 141 and 142 may be formed appropriately considering a touch surface of a finger or pen. For example, the first common electrode 141 may be formed to include several tens of pixels or several hundreds of pixels.

Hereinafter, the first and second common electrodes 141 and 142 serving as the sensing electrodes will be described in more detail.

First of all, in order to sense the position of the X axis touched by the user, the plurality of second common electrodes 142 are spaced apart from one another at predetermined intervals in X axis direction. Also, the second common electrodes 142 are longitudinally formed in a Y axis direction, and their end is connected with a sensing circuit although not shown.

Accordingly, if the user touches a predetermined position, the sensing circuit recognizes the second common electrode 142 of which capacitance is varied, among the plurality of second common electrodes 142. As a result, the position of the X axis touched by the user can be sensed.

Next, in order to sense the position of the Y axis touched by the user, the plurality of first common electrodes 141 are spaced apart from one another at predetermined intervals in Y axis direction. However, if the first common electrodes 141 are longitudinally formed in X axis direction, the first common electrode 141 and the second common electrode 142 are electrically connected with each other, whereby the positions of the X axis and the Y axis touched by the user cannot be sensed. Accordingly, the first common electrodes 141 are not formed longitudinally in X axis direction but spaced apart from one another at predetermined intervals in X axis direction. In other words, as shown, the second common electrode 142 is formed between the first common electrodes 141 in X axis direction, whereas the second common electrode 142 is not formed between the first common electrodes 141 in Y axis direction.

Since the plurality of first common electrodes 141 are spaced apart from one another at predetermined intervals in X axis direction by interposing the second common electrode 142 therebetween as described above, it is required that the plurality of first common electrodes 141 are electrically connected with one another.

The sensing line 160 is extended in X axis direction as above to electrically connect the first common electrodes 141 with one another. Although not shown, the end of the sensing line 160 is connected with the sensing circuit.

Accordingly, if the user touches a predetermined position, the sensing circuit recognizes the first common electrode 141 of which capacitance is varied, among the plurality of first common electrodes 141. As a result, the position of the Y axis touched by the user can be sensed.

Meanwhile, although the sensing line 160 serves to electrically connect the first common electrodes 141 arranged in X axis direction with one another, the first common electrode 141 should not be connected with the second common electrode 142 electrically due to the sensing line 160. Accordingly, although the sensing line 160 is electrically connected with the first common electrodes 141, it is not connected with the second common electrodes 142 electrically.

Meanwhile, the sensing line 160 is connected with the common electrodes 140 through a predetermined first contact hole 151. In this case, since the first contact hole 151 is formed only in a region for the first common electrodes 141, the sensing line 160 is electrically connected with the first common electrode 141 through the first contact hole 151 but is not connected with the second common electrode 142 electrically.

Meanwhile, although one sensing line 160 is connected with the first common electrode 141 as shown, a plurality of sensing lines 160 may be connected with the first common electrode 141. Particularly, since a transparent conductive oxide having high resistance such as ITO is generally used as the first common electrode 141, the plurality of sensing lines 160 of metal having excellent electric conductivity are preferably connected with the first common electrode 141 to reduce resistance.

If the sensing line 160 is formed of opaque metal having excellent electric conductivity to reduce resistance, light transmittance may be reduced due to the sensing line 160. Accordingly, the sensing line 160 is preferably formed in a non-transmissive region through which light is not transmitted, to prevent light transmittance from being reduced. Namely, as shown in the partially enlarged view of FIG. 2a, the sensing line 160 is preferably formed in a region corresponding to the gate line 110.

Also, although the first common electrode 141 is connected with the sensing line 160 through the two first contact holes 151 as shown, it may be connected with the sensing line 160 through one first contact hole 151 or three or more first contact holes 151. However, in order to reduce resistance, it is preferable to increase the number of the first contact holes 151. Also, as shown in the partially enlarged view of FIG. 2a, the first contact hole 151 may be formed in the region where the gate line 110 and the data line 120 cross each other. However, the position of the first contact holes 151 is not limited to the example of FIG. 2a.

It has been described that the second common electrodes 142 are longitudinally arranged in Y axis direction and the first common electrodes 141 are connected with the sensing line 160 in X axis direction. However, the second common electrodes 142 may longitudinally be arranged in X axis direction, and the first common electrodes 141 may be connected with the sensing line 160 in Y axis direction. If the sensing line 160 is extended in Y axis direction, it is preferably formed in a region corresponding to the data line 120 to prevent light transmittance from being reduced.

Hereinafter, a sectional structure of the liquid crystal display device according to the first embodiment of the present invention will be described with reference to FIG. 2b and FIG. 2c.

FIG. 2b corresponds to a section of the gate line 110 taken in a vertical direction. As shown in FIG. 2b, the gate line 110 is formed on the substrate 100, and a gate insulating film 115 is formed on the gate line 110. Also, the data line 120 is formed on the gate insulating film 115 at a predetermined interval, and a first passivation film 125 is formed on the data line 120.

The first common electrode 141 and the second common electrode 142 are alternately formed on the first passivation film 125, a second passivation film 150 is formed on the first common electrode 141 and the second common electrode 142, and the sensing line 160 is formed on the second passivation film 150.

At this time, since the first contact hole 151 is formed in the second passivation film 150, the sensing line 160 is electrically connected with the first common electrode 141 through the first contact hole 151. Particularly, since the first contact hole 151 is formed in the region corresponding to the first common electrode 141, the sensing line 160 is electrically connected with the first common electrode 141 but is not electrically connected with the second common electrode 142.

FIG. 2c corresponds to a section of the pixel region taken in a vertical direction. As shown in FIG. 2c, the gate electrode 112 is formed on the substrate 100, and the gate insulating film 115 is formed on the gate electrode 112. Also, the semiconductor layer 117 is formed on the gate insulating film 115, and source and drain electrodes 122 and 124 are formed on the semiconductor layer 117 to face each other.

Since the pixel electrode 130 is formed on the drain electrode 124, the drain electrode 124 is directly connected with the pixel electrode 130. Meanwhile, although the pixel electrode 130 may be extended to the upper surface of the drain electrode 124 as shown, it may be extended to the lower surface of the drain electrode 124.

The first passivation film 125 is formed on the pixel electrode 130, the common electrode 140 is formed on the first passivation film 125, and a second passivation film 150 is formed on the common electrode 140.

Since the common electrode 140 includes one or more slits 145 above the pixel electrode 130, a fringe field may be formed between the pixel electrode 130 and the common electrode 140.

Meanwhile, the aforementioned liquid crystal display device according to the first embodiment of the present invention may be driven by a projected cap mode such as a self cap mode or a mutual cap mode.

The projected cap mode allows the user to sense the positions of the X axis and the Y axis by sensing capacitance varied between the first common electrode 141 and the second common electrode 142 if the user touches a predetermined position. The projected cap mode may be divided into a self cap mode and a mutual cap mode depending on a voltage mode applied to the electrodes 141 and 142.

The self cap mode is to sense the positions of the X axis and the Y axis by sensing capacitance variation between the first common electrode 141 and the second common electrode 142 when the user touches a predetermined position after simultaneously applying a voltage to the sensing lines 160 connecting the first common electrodes 141.

By contrast, the mutual cap mode is to sense the positions of the X axis and the Y axis by sensing capacitance variation between the first common electrode 141 and the second common electrode 142 when the user touches a predetermined position after applying a voltage to the sensing lines 160, which connects the first common electrodes 141, in accordance with a time gap. In other words, the mutual cap mode means that the sensing line 160 serves as a transmission line and the common electrode 142 serves as a reception line, and has recently received more attention than the self cap mode.

Figure 3A:
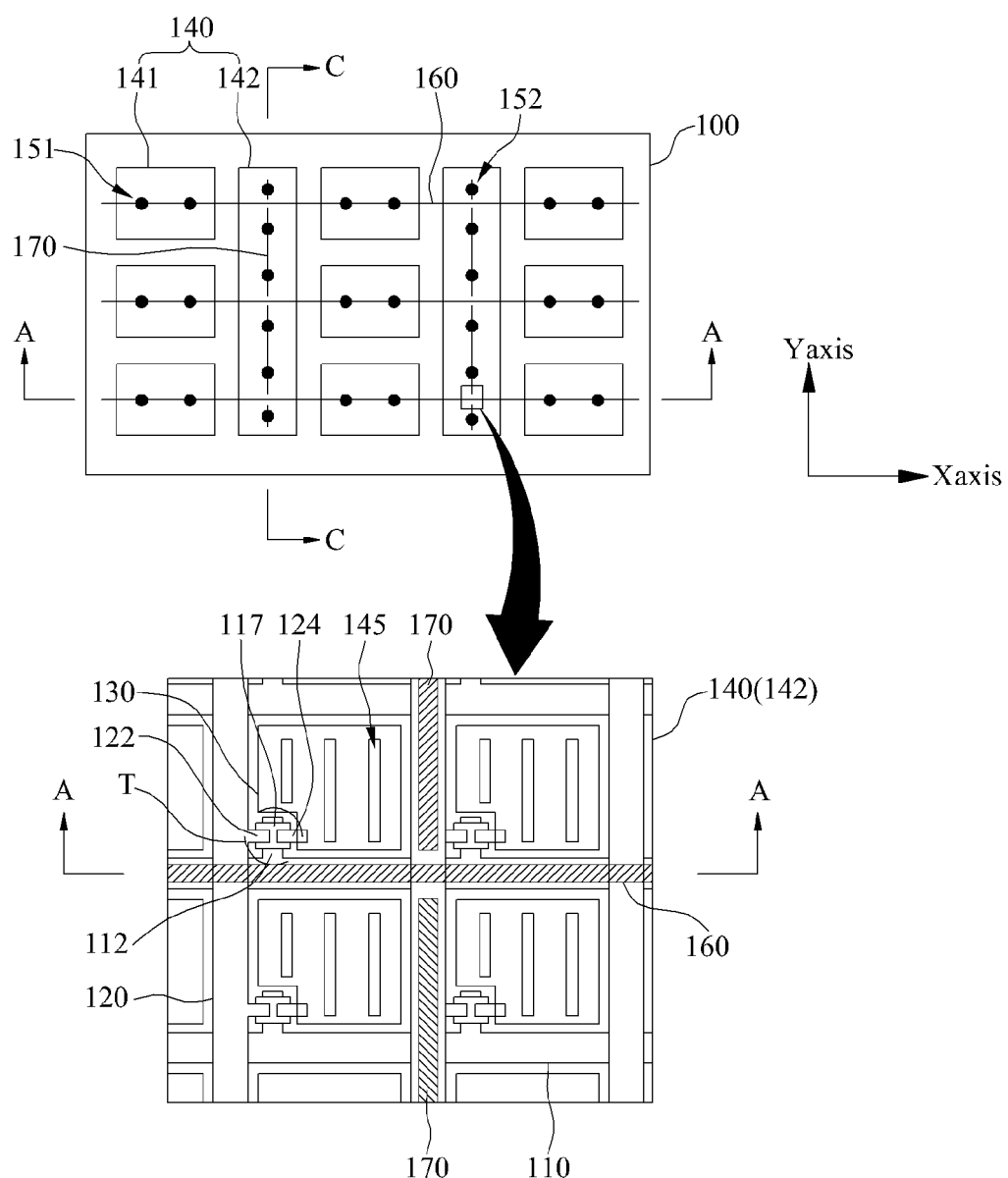
FIG. 3a is a plane view illustrating a lower substrate for a liquid crystal display device according to the second embodiment of the present invention.
Figure 3B:
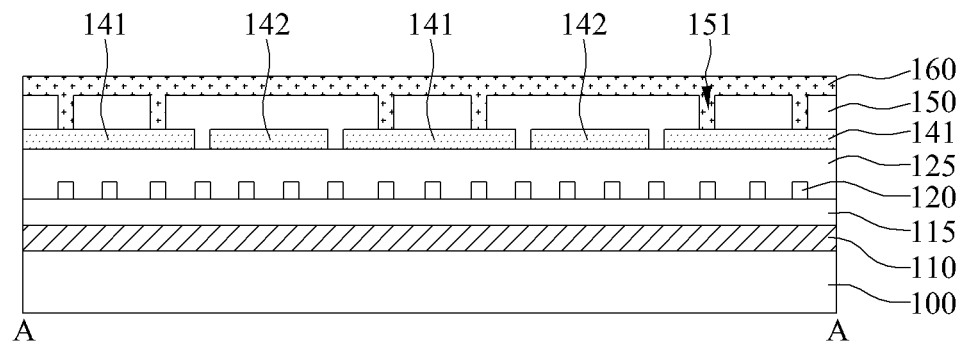
Figure 3C:
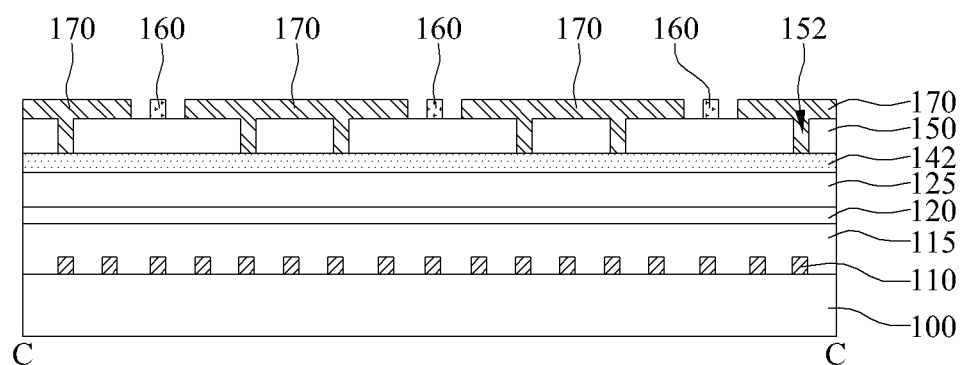

FIG. 3a is a plane view illustrating a lower substrate for a liquid crystal display device according to the second embodiment of the present invention, FIG. 3b is a cross-sectional view taken along line A-A of FIG. 3a, and FIG. 3c is a cross-sectional view taken along line C-C of FIG. 3a.

The lower substrate for the liquid crystal display device according to the second embodiment of the present invention as shown in FIG. 3a to FIG. 3c is the same as that for the liquid crystal display device according to the first embodiment of the present invention except that a conductive line 170 is additionally connected with a plurality of second common electrodes 142. Accordingly, the same reference numbers will be used throughout the drawings to refer to the same or like parts, and detailed description of the same or like parts will be omitted.

As shown in FIG. 3a, according to the second embodiment of the present invention, the conductive line 170 is connected with the plurality of second common electrodes 142.

A transparent conductive oxide such as ITO is generally used as the second common electrode 142. The transparent conductive oxide has a problem in that resistance is high. Accordingly, in the second embodiment of the present invention, the conductive line 170 of a metal having excellent electric conductivity is connected with the second common electrode 142 to reduce resistance of the second common electrode 142.

The conductive line 170 is connected with the second common electrode 142 through a second contact hole 152. In this case, it is preferable that more second contact holes 152 are provided to reduce resistance.

It is preferable that the conductive line 170 is extended in a length direction of the second common electrode 142, i.e., Y axis direction. However, in this case, the conductive line 170 is cross-connected with the sensing line 160, whereby short occurs. Accordingly, the conductive line 170 is formed as a discontinuous line such that it is not connected with the sensing line 160.

The conductive line 170 may be formed of the same opaque metal as that of the sensing line 160 by the same process as that of the sensing line 160. If the conductive line 170 is formed of the opaque metal, light transmittance may be reduced due to the conductive line 170. Accordingly, the conductive line 170 is preferably formed in a non-transmissive region through which light is not transmitted, to prevent light transmittance from being reduced. Namely, as shown in the partially enlarged view of FIG. 3a, the conductive line 170 is preferably formed in a region corresponding to the data line 120.

Although one discontinuous conductive line 170 is connected with the second common electrode 142 as shown, it is preferable that a plurality of conductive lines 170 are connected with the second common electrode 142 to minimize resistance of the second common electrode 142. Also, it is preferable that each of the plurality of conductive lines 170 is formed in the region corresponding to the data line 120 to prevent light transmittance from being reduced. The conductive line 170 may be formed in a region corresponding to the gate line 110 as the case may be.

FIG. 3b corresponds to a section of line A-A of FIG. 3a, and is the same as FIG. 2b of the first embodiment. Accordingly, the repeated description will be omitted.

FIG. 3c corresponds to a section of the data line 120 taken along line C-C of FIG. 3a in a vertical direction. In more detail, gate lines 110 are formed on the substrate 100 at predetermined intervals, and a gate insulating film 115 is formed on the gate lines 110. Also, a data line 120 is formed on the gate insulating film 115, and a first passivation film 125 is formed on the data line 120.

A second common electrode 142 is formed on the first passivation film 125, and a second passivation film 150 is formed on the second common electrode 142.

A sensing line 160 and a conductive line 170 are alternately formed on the second passivation film 150. At this time, since a second contact hole 152 is formed in the second passivation film 150, the conductive line 170 is electrically connected with the second common electrode 142 through the second contact hole 152.

Figure 4A:
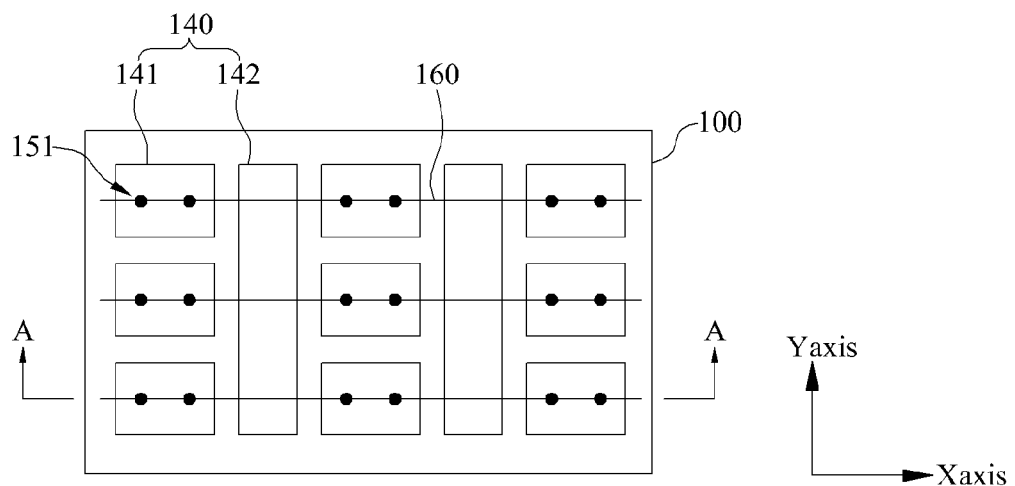
FIG. 4a is a plane view illustrating a lower substrate for a liquid crystal display device according to the third embodiment of the present invention.
Figure 4B:
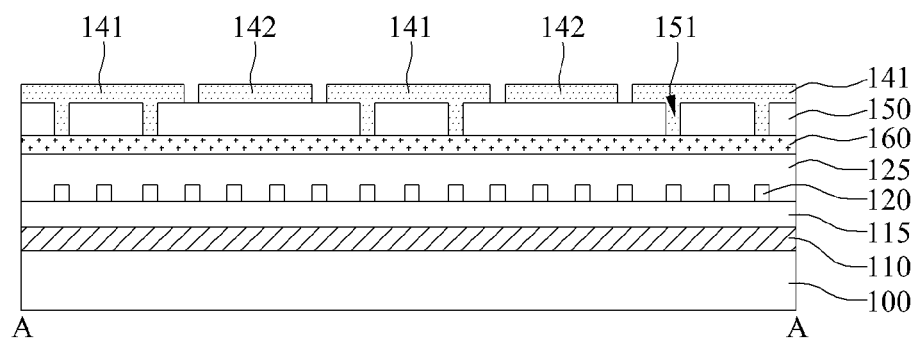

FIG. 4a is a plane view illustrating a lower substrate for a liquid crystal display device according to the third embodiment of the present invention, and FIG. 4b is a cross-sectional view taken along line A-A of FIG. 4a.

The lower substrate for the liquid crystal display device according to the third embodiment of the present invention as shown in FIG. 4a and FIG. 4b is the same as that for the liquid crystal display device according to the first embodiment of the present invention except for a layer formed between the common electrodes 141 and 142 and the sensing line 160. Accordingly, the same reference numbers will be used throughout the drawings to refer to the same or like parts, and repeated description of the same or like parts will be omitted.

In the first embodiment of the present invention as described above, the common electrodes 141 and 142 and the sensing line 160 are formed by interposing the second passivation film 150 therebetween, wherein the common electrodes 141 and 142 are formed below the second passivation film 150 and the sensing line 160 is formed over the second passivation film 150.

However, in the third embodiment of the present invention, although the common electrodes 141 and 142 and the sensing line 160 are formed by interposing the second passivaiton film 150, the first common electrodes 141 and 142 are formed over the second passivation film 150 and the sensing line 160 is formed below the second passivation film 150.

Referring to FIG. 4b, a gate line 110 is formed on a substrate 100, a gate insulating film 115 is formed on the gate line 110, a data line 120 is formed on the gate insulating film 115, and a first passivation film 125 is formed on the data line 120.

The sensing line 160 is formed on the first passivation film 125, and the second passivation film 150 is formed on the sensing line 160. Also, the first common electrode 141 and the second common electrode 142 are alternately formed on the second passivation film 150.

At this time, since the first contact hole 151 is formed in the second passivation film 150, the sensing line 160 is electrically connected with the first common electrode 141 through the first contact hole 151. Particularly, since the first contact hole 151 is formed in the region corresponding to the first common electrode 141, the sensing line 160 is electrically connected with the first common electrode 141 but is not electrically connected with the second common electrode 142.

Figure 5A:
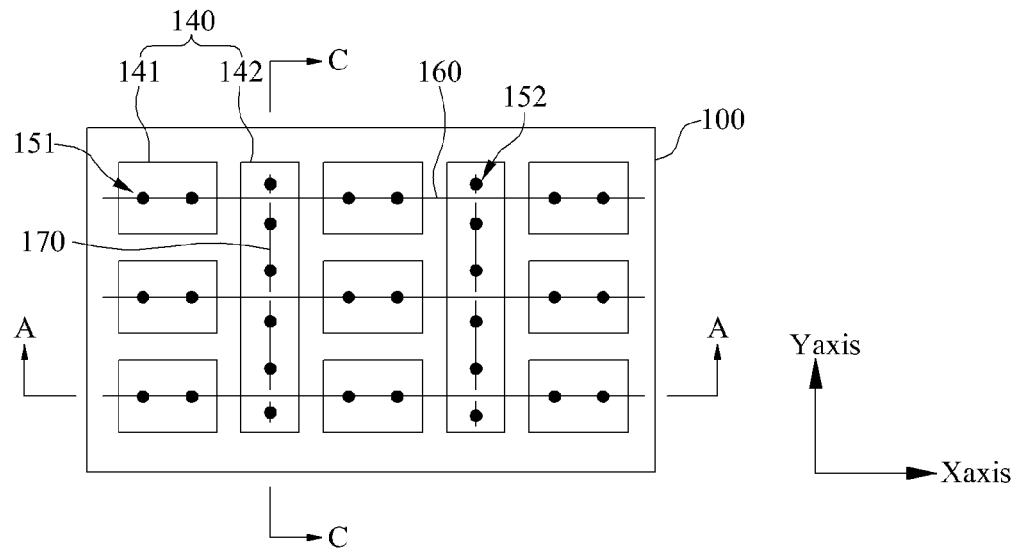
FIG. 5a is a plane view illustrating a lower substrate for a liquid crystal display device according to the fourth embodiment of the present invention.
Figure 5B:
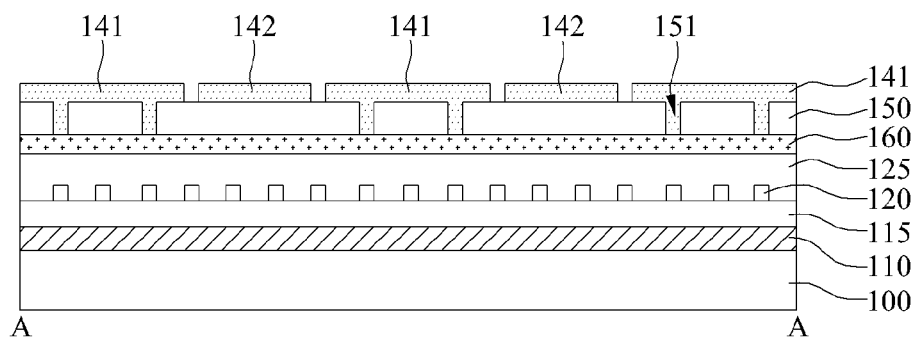
Figure 5C:
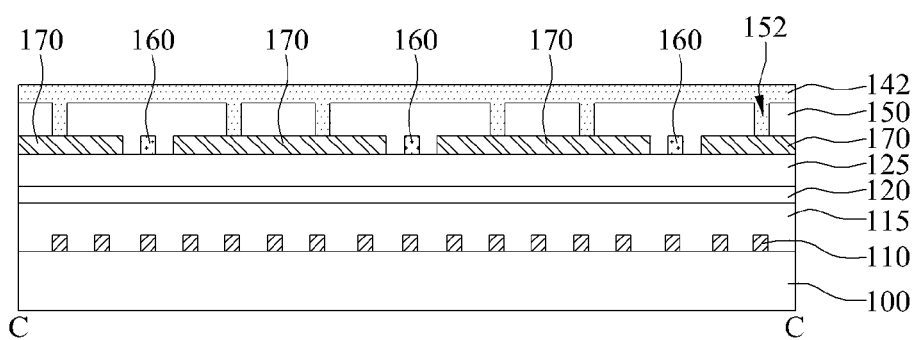

FIG. 5a is a plane view illustrating a lower substrate for a liquid crystal display device according to the fourth embodiment of the present invention, FIG. 5b is a cross-sectional view taken along line A-A of FIG. 5a, and FIG. 5c is a cross-sectional view taken along line C-C of FIG. 5a.

The lower substrate for the liquid crystal display device according to the fourth embodiment of the present invention as shown in FIG. 5a to FIG. 5c is the same as that for the liquid crystal display device according to the third embodiment of the present invention except that a conductive line 170 is additionally connected with a plurality of second common electrodes 142. Accordingly, the same reference numbers will be used throughout the drawings to refer to the same or like parts, and detailed description of the same or like parts will be omitted.

As shown in FIG. 5a, according to the fourth embodiment of the present invention, since the conductive line 170 of a metal having excellent electric conductivity is connected with a plurality of second common electrodes 142, resistance of the second common electrodes 142 may be reduced.

The conductive line 170 is connected with the second common electrode 142 through a second contact hole 152. In this case, it is preferable that more second contact holes 152 are provided to reduce resistance.

The conductive line 170 is formed as a discontinuous line such that it is not connected with the sensing line 160.

It is preferable that the conductive line 170 is formed in a non-transmissive region through which light is not transmitted, i.e., a region corresponding to the data line, to prevent light transmittance from being reduced. It is also preferable that a plurality of conductive lines 170 are connected with the second common electrode 142 to minimize resistance of the second common electrode 142.

FIG. 5b corresponds to a section of line A-A of FIG. 5a, and is the same as FIG. 4b of the third embodiment. Accordingly, the repeated description will be omitted.

FIG. 5c corresponds to a section of the data line 120 taken along line C-C of FIG. 5a in a vertical direction. In more detail, gate lines 110 are formed on the substrate 100 at predetermined intervals, and a gate insulating film 115 is formed on the gate lines 110. Also, a data line 120 is formed on the gate insulating film 115, and a first passivation film 125 is formed on the data line 120.

A sensing line 160 and a conductive line 170 are alternately formed on the first passivation film 125.

A second passivation film 150 is formed on the conductive line 170 and the sensing line 160, and a second common electrode 142 is formed on the second passivation film 150. At this time, since a second contact hole 152 is formed in the second passivation film 150, the conductive line 170 is electrically connected with the second common electrode 142 through the second contact hole 152.

The lower substrate constituting the liquid crystal display device according to the present invention has been described in detail as above. Accordingly, the liquid crystal display device according to the present invention includes the lower substrate, an upper substrate provided with a color filter, and a liquid crystal layer formed between both substrates.

The upper substrate may include light shielding layers for shielding light from leaking to a region other than the pixel region, color filter layers of red R, green G and blue B formed between the light shielding layers, and an overcoat layer formed on the color filter layers. Various modifications known in the art may be made in the above structure of the upper substrate.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

As described above, the liquid crystal display device according to the present invention has the following advantages.

Since the common electrode used to form an electric field for driving a liquid crystal is used as a sensing electrode for sensing a touch of a user, a separate touch screen on the liquid crystal panel is not required unlike the related art, whereby the overall thickness of the liquid crystal display device is reduced, fabricating process steps are simplified, and the fabricating cost is reduced.

What is claimed is:

1. A liquid crystal display device comprising:
gate and data lines arranged to cross each other on a substrate to define a pixel region;
a pixel electrode formed in the pixel region;
a common electrode forming an electric field together with the pixel electrode and sensing a touch of a user; and
a sensing line electrically connected with the common electrode, wherein the common electrode includes a plurality of first common electrodes for sensing any one of a touch position of X axis and a touch position of Y axis and a plurality of second common electrodes for sensing the other one of the touch positions of X axis and Y axis, and the sensing line is not electrically connected with the plurality of second common electrodes but electrically connected with the plurality of first common electrodes,
wherein the common electrode and the sensing line are formed on the same substrate, and
wherein the plurality of second common electrodes are continuously extended from one end portion of the substrate to the other portion of the substrate; and
a conductive line electrically connected with the second common electrodes to reduce resistance of the second common electrodes.

2. The liquid crystal display device of claim 1, wherein the pixel electrode is formed below a first passivation film, and the common electrode is formed over the first passivation film and includes one or more slits in the pixel region.

3. The liquid crystal display device of claim 1, wherein the sensing line and the common electrode are spaced apart from each other by interposing a second passivation film therebetween, and the sensing line is electrically connected with the first common electrodes through a first contact hole provided in the second passivation film.

4. The liquid crystal display device of claim 1, wherein the sensing line is formed in a region corresponding to the gate line or the data line.

5. The liquid crystal display device of claim 1, wherein each of the second common electrodes is longitudinally extended in X axis direction or Y axis direction, and the respective first common electrodes are spaced apart from each other by interposing the second common electrodes therebetween.

6. The liquid crystal display device of claim 5, wherein the sensing line is extended in a direction crossing the extended direction of the second common electrodes.

7. The liquid crystal display device of claim 1, wherein the conductive line is spaced apart from the common electrode by interposing the second passivation film therebetween, and is electrically connected with the second common electrode through a second contact hole provided in the second passivation film.

8. The liquid crystal display device of claim 1, wherein the conductive line is formed in a region corresponding to the gate line or the data line.

9. The liquid crystal display device of claim 1, wherein the conductive line is not electrically connected with the sensing line.

* * * * *